(12) United States Patent
Schaub

(10) Patent No.: US 7,637,667 B1
(45) Date of Patent: Dec. 29, 2009

(54) BEARING ASSEMBLY FOR A STEERING ASSEMBLY

(75) Inventor: Brian D. Schaub, Camillus, NY (US)

(73) Assignee: Kilian Manufacturing Corp., Syracuse, NY (US)

( * ) Notice: Subject to any disclaimer, the term of this patent is extended or adjusted under 35 U.S.C. 154(b) by 377 days.

(21) Appl. No.: 11/773,715

(22) Filed: Jul. 5, 2007

(51) Int. Cl.
*F16C 27/06* (2006.01)

(52) U.S. Cl. ..................................... 384/536
(58) Field of Classification Search ................. 384/536, 384/582; 74/492
See application file for complete search history.

(56) References Cited

U.S. PATENT DOCUMENTS

| 2,974,467 | A | * | 3/1961 | Long | 384/536 |
| 3,415,500 | A | * | 12/1968 | Pethis | 384/536 |
| 4,652,152 | A | * | 3/1987 | Brandenstein et al. | 384/496 |
| 5,193,917 | A | * | 3/1993 | Adler et al. | 384/517 |
| 6,186,668 | B1 | | 2/2001 | Beaman | |
| 6,419,397 | B1 | | 7/2002 | Beaman | |
| 6,474,875 | B1 | * | 11/2002 | Waseda et al. | 384/582 |
| 6,913,391 | B2 | * | 7/2005 | Weisskopf et al. | 384/536 |
| 6,939,052 | B1 | * | 9/2005 | Hull | 384/535 |

* cited by examiner

*Primary Examiner*—Thomas R Hannon
(74) *Attorney, Agent, or Firm*—Dykema Gossett PLLC

(57) ABSTRACT

A bearing assembly is provided that enables the bearing assembly to be press fit onto a steering shaft and/or within a shaft housing without excessive stress on the bearing races and without affecting bearing clearance or torque requirements while also tolerating angular misalignment between the shaft and housing. The assembly includes unbroken inner and outer races with ball bearings disposed therebetween. A housing assembly includes a radially extending wall on one side of the outer race and a deformable axially extending wall. A elastomeric isolator also includes a radially extending wall and a deformable axially extending wall that are disposed between the outer race and the corresponding walls of the bearing assembly housing. A washer is disposed on an opposite side of outer race and is disposed between radially inwardly extending lips formed by deformation of the axially extending walls of the isolator and housing.

16 Claims, 3 Drawing Sheets

BEARING ASSEMBLY FOR A STEERING ASSEMBLY

BACKGROUND OF THE INVENTION

1. Field of the Invention

This invention relates to bearings for use in steering assemblies and, more particularly, to a bearing assembly that can be press fit onto a steering shaft and/or within a shaft housing without excessive stress on the bearing races and without significant impact on steering torque while also tolerating angular misalignment between the shaft and housing.

2. Disclosure of Related Art

In a conventional steering assembly for a vehicle or other device, a steering wheel or other steering input member is connected through a steering shaft (i.e., the steering column) to a steering gear or similar component used to transmit motion from the input member to one or more steered wheels. The steering shaft is supported within a housing for relative rotation by bearing assemblies. For proper functioning of the steering assembly, the clearances between (i) the bearing assembly and the shaft and/or (ii) the bearing assembly and the housing are relatively small. A variety of bearing assemblies have been developed for use in steering assemblies, but each of these conventional bearing assemblies has one or more significant deficiencies.

One conventional bearing assembly used in steering applications includes a pair of opposed spring preloaded angular contact bearings. In this type of bearing assembly, means, such as a wedge, are provided to remove clearance between either the steering shaft and the inner race of the bearing or the shaft housing and the outer race of the bearing. In addition to requiring the wedge, this type of bearing assembly is difficult to use in steering applications because the tolerances in steering applications result in significant variation in spring compression and, therefore, bearing preload ultimately impacting system stiffness and torque requirements. This type of bearing assembly also has difficulty accommodating angular misalignment in the system and generates a fair amount of acoustic noise due to relative motion between the bearing elements, preload components and the steering shaft and housing.

Another conventional bearing assembly used in steering applications is an elastomer preloaded ball bearing in which an elastomeric material acts as a spring on a split inner race or a split outer race to preload the ball bearings and the bearing races. Because of the difficulty in maintaining the position of the split race, this type of bearing assembly is unable to handle significant loads. The assembly also has significant torque requirements because significant preloads are required to maintain proper stiffness for steering applications and the required torque can also vary.

Yet another conventional bearing assembly used in steering applications is an elastomer preloaded needle bearing in which an elastomeric material acts on a split or deformed outer race to preload the needle bearings and bearing races. Again, the difficulty in maintaining the position of the split race and variations in load on the deformed race make the assembly unsuitable for relatively large loads. Further, the assembly has significant torque requirements because of the significant preloads required to maintain proper stiffness for steering applications.

Another conventional bearing assembly sometimes used in steering applications includes precision ground ball bearings such as ground race ball bearings. This type of bearing assembly is very sensitive to misalignment, however, which can result in relatively high and variable torque requirements and premature bearing failure. As a result, precision ball bearings generally cannot be used in steering applications.

Conventional bearing assemblies are typically press-fit onto the steering shaft and/or shaft housing. The races in each of the above-described bearing assemblies are subject to damage when press-fit. To reduce the risk of damage, steering systems have been modified to reduce tolerances in the system and/or adapters have been required to absorb pressure from the press-fit. In addition, the press-fit relationship creates specific problems for certain types of bearing assemblies. Precision bearings, for example, typically cannot be used because they are more likely to suffer damage or to be impacted by a reduction in clearance than other bearings. Preloaded bearings suffer from changes to the preload caused by the press-fit effecting stiffness and rotational torque requirements.

The inventors herein have recognized a need for a bearing assembly that will minimize and/or eliminate one or more of the above-identified deficiencies.

SUMMARY OF THE INVENTION

The present invention provides a bearing assembly that can be press fit onto a steering shaft and/or within a shaft housing without excessive stress on the bearing races and without significant impact on steering torque while also tolerating angular misalignment between the shaft and housing.

A bearing assembly in accordance with the present invention includes an unbroken, annular inner race disposed about a first axis and an unbroken, annular outer race disposed about the inner race. A plurality of ball bearings are disposed between the inner and outer races. The assembly further includes a housing having a first radially extending wall disposed on one axial side of outer race and a deformable axially extending wall extending from the first radially extending wall along a second axis extending parallel to the first axis. An elastomeric isolator is disposed between the housing and the outer race. The isolator has a first radially extending wall disposed between the one axial side of the outer race and the first radially extending wall of the housing. The isolator further has a deformable axially extending wall extending from the first radially extending wall of the isolator along a third axis extending parallel to the first axis. The axially extending wall of the isolator is disposed between a radially outer surface of the outer race and the axially extending wall of the housing. The assembly further includes a washer disposed on a second axial side of the outer race. The washer is disposed between a second radially extending wall of the housing and a second radially extending wall of the isolator formed by deformation of the axially extending walls of the housing and the isolator wherein the second radially extending wall of the isolator is disposed between the washer and the second axial side of the outer race. In accordance with one embodiment of the invention, the bearing assembly may further include bushing or an elastomeric ring disposed radially inwardly of the inner race.

A bearing assembly in accordance with the present invention represents a significant improvement relative to conventional bearing assemblies for steering applications. The isolator enables the assembly to be press fit to the steering shaft housing without undue stress on the outer race and without affecting internal bearing clearance or torque requirements. Similarly, in embodiments including the bushing or elastomeric rings, the bushing or rings enable the assembly to be press fit to the steering shaft without undue stress on the inner race and without affecting internal bearing clearance or torque requirements. Further, the isolator enables the assembly to better tolerate angular misalignment with the shaft or shaft housing without significantly affecting torque requirements. The improved structure further facilitates the use of precision ball bearings and ground raceways thereby promoting smooth operating of the steering assembly and eliminating the need for external preloading and related components.

These and other advantages of this invention will become apparent to one skilled in the art from the following detailed description and the accompanying drawings illustrating features of this invention by way of example.

DETAILED DESCRIPTION OF EMBODIMENTS OF THE INVENTION

Figure 1:
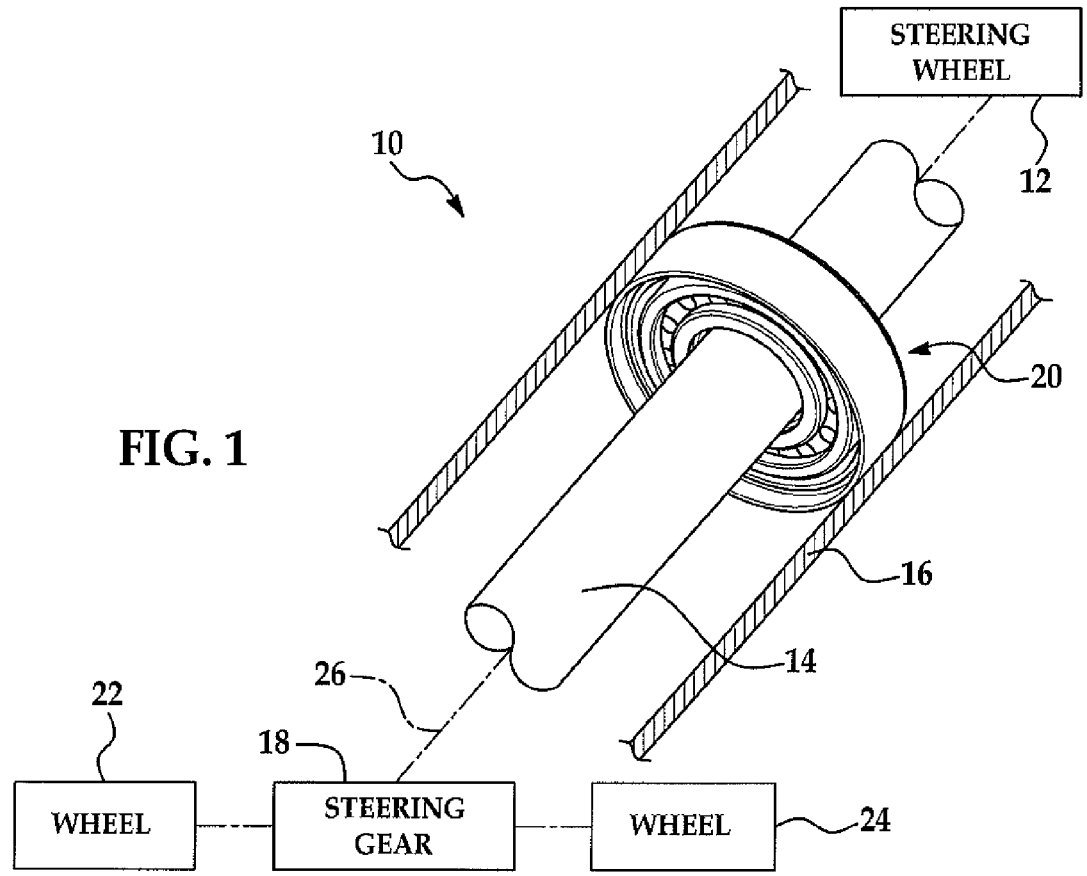
FIG. 1 is a diagrammatic view of a steering assembly incorporating a bearing assembly in accordance with the present invention.

Referring now to the drawings wherein like reference numerals are used to identify identical components in the various views, FIG. 1 illustrates a steering assembly 10 in accordance with the present invention. Assembly 10 may included a steering input device such as a steering wheel 12, a steering shaft 14, a housing 16, a steering gear 18 and one or more bearing assemblies 20 in accordance with the present invention. Assembly 10 may be used for steering a vehicle, but it should be understood that the present invention could be used in a variety of applications requiring steerable movement and in non-steer applications as well in which low clearance, low torque movement is required with large shaft and housing tolerances.

Steering wheel 12 is provided to allow an operator to direct movement of steered wheels 22, 24. Wheel 12 is conventional in the art and is coupled, directly or indirectly, to one end of steering shaft 14.

Steering shaft 14 transmits motion from steering wheel 12 to steering gear 18 and is also conventional in the art. Shaft 14 is disposed within housing 16 and is disposed about a rotational axis 26. Shaft 14 may be coupled directly to steering wheel 12 or indirectly through, e.g., a universal joint.

Housing 16 provides structural support for shaft 14 and other components (not shown) of steering assembly 10 and protects the components from damage from external objects and elements. Housing 16 is conventional in the art and may be centered about shaft 14 and axis 26.

Steering gear 18 is provided to translate rotational motion from steering wheel 12 and shaft 14 to linear motion to turn wheels 22, 24. Steering gear 18 is conventional in the art and may transfer motion to wheels 22, 24 through a conventional steering linkage or rack (not shown), and steering arms (not shown).

Figure 2:
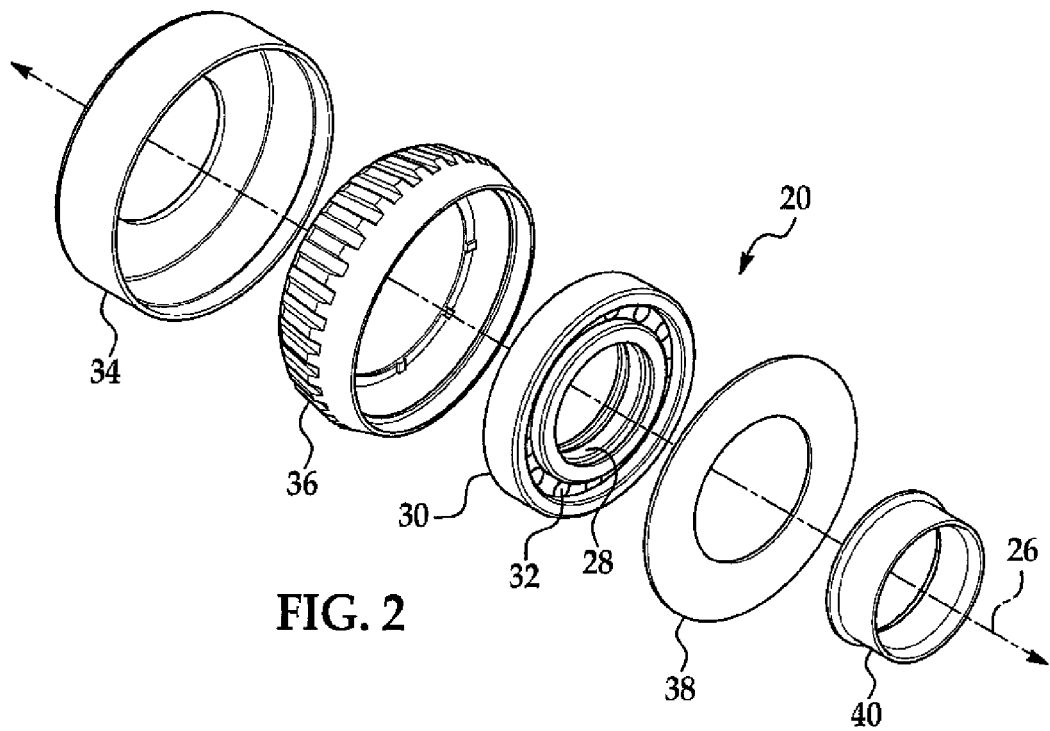
FIG. 2 is an exploded perspective view of a bearing assembly in accordance with one embodiment of the present invention.
Figure 3:
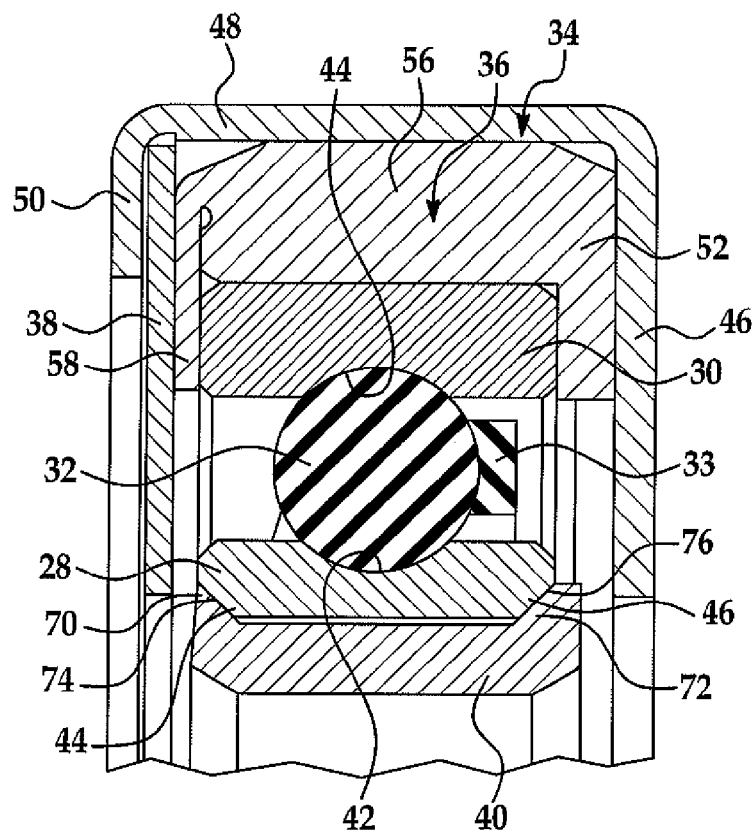
FIG. 3 is a partial cross-sectional view of the bearing assembly of FIG. 2.

Bearing assembly 20 is provided to support shaft 14 within housing 16 for rotation relative to housing 16. Referring to FIGS. 2-3, bearing assembly 20 may include inner and outer races 28, 30, ball bearings 32, a bearing retainer 33, a housing 34, an elastomeric isolator 36, a washer 38 and a bushing 40.

Referring to FIG. 3, inner race 28 provides an inner raceway 42 for bearings 32. Raceway 42 is preferably a ground raceway formed using a conventional grinder. Inner race 28 is disposed about shaft 14 and axis 26 and may be made from conventional metals or metal alloys. The radially inner surface of race 28 may define beveled edges 44, 46 at either axial end to facilitate axial retention of race 28 by bushing 40.

Outer race 30 provides an outer raceway 44 for engagement with bearings 32. Again, raceway 44 is preferably a ground raceway formed using a conventional grinder. Outer race 30 is disposed radially outward of inner race 26 and is also disposed about shaft 14 and axis 26. Like race 28, race 30 may be made from conventional metals and metal alloys.

Bearings 32 are provided to allow relative rotation of inner and outer races 28, 30 (and shaft 14 and housing 16). Bearings 32 are made from conventional metals and metal alloys. Bearings 32 are preferably smooth, low tolerance bearings of the type commonly referred to as precision bearings in the art. Bearings 32 may comprise ground race bearings. It should be understood, however, that standard, non-precision bearings could also be employed. Bearings 32 are disposed between races 28, 30 within raceways 42, 44.

Retainer 33 is provided maintain equal spacing between bearings 32 and reduce friction in bearing assembly 20. Retainer 33 is conventional in the art and is disposed between races 28, 30.

Housing 34 provides structural support and positions the components of assembly 20. Housing 34 may be made from conventional metals and metal alloys such as steel. Housing 34 is adapted to be press fit into steering shaft housing 16 and provides sufficient stiffness and friction to maintain the position of assembly 20. Housing 34 may also be deformed and is therefore capable of addressing large tolerances in housing 16. Housing 34 includes a radially extending wall 46. Wall 46 is annular and may be disposed about axis 26 upon assembly. Wall 46 is disposed on one axial side of races 26, 28 and is axially spaced therefrom. Wall 46 may extend inwardly to a point intermediate the radially inner and outer surfaces of inner race 26. Housing 34 also includes a deformable axially extending wall 48. Wall 48 extends axially from wall 46 along an axis parallel to axis 26. Wall 48 is disposed radially outward from race 28 and is spaced therefrom. During assembly, the axial end of wall 48 opposite wall 46 is deformed radially inwardly against washer 38 to form another radially extending wall 50 or lip generally parallel to wall 46.

Figure 4:
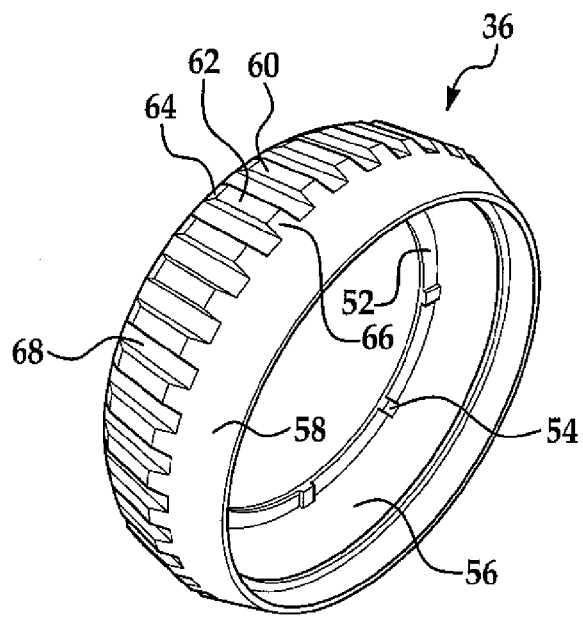
FIG. 4 is an enlarged perspective view of the isolator of a bearing assembly in accordance with the present invention.

Isolator 36 enables assembly 20 to be press-fit to housing 16 without undue stress on race 30 and without affecting the internal clearance of bearings 32. Isolator 36 also enables assembly 20 to better tolerate angular misalignment with the shaft 14 or housing 16 and facilitates the use of precision bearings. Isolator 36 is made from an elastomeric material such as thermoplastic elastomers (TPEs), rubber or urethane. Isolator 36 defines a radially extending wall 52. Wall 52 is annular and may be disposed about axis 26 upon assembly. Referring to FIG. 3, at least a portion of wall 52 is disposed between one axial side of outer race 30 and wall 46 of housing 34. Wall 52 may extend radially inwardly to a point aligned with a radially inner diameter of outer race 30. Referring to FIG. 4, isolator 36 may define pads 54 projecting axially from wall 52. Pads 54 may be circumferentially spaced around wall 52 at equal distances and may be generally rectangular in shape. Pads 54 are configured to engage one axial side of outer race 30 and are provided to absorb angular misalignment between shaft 14, housing 16 and inner and outer races 28, 30. Further, pads 54 isolate races 28, 30 and bearings 32 from wall 46. Referring again to FIG. 3, isolator 36 also includes a deformable axially extending wall 56. Wall 56 extends axially from wall 52 along an axis parallel to axis 26. Wall 56 is disposed radially outwardly of race 30 between a radially outer surface of race 30 and a radially inner surface of wall 48 of housing 34. Wall 56 may taper inwardly proximate one axial end opposite wall 52 and may be deformed radially inwardly against one axial side of outer race 30 to form another radially inwardly extending wall 58 or lip. Wall 58 isolates races 28, 30 and bearings 32 from washer 38. Referring to FIG. 4, wall 56 may further define a plurality of ribs 60 on a radially outer surface. Ribs 60 may define generally rectangular surfaces 62 terminating in beveled surfaces 64, 66 extending to walls 52, 58, respectively. Grooves 68 are defined between adjacent ribs 60. Ribs 60 are provided to absorb forces associated with the press-fit of assembly 20 to housing 16. In particular, isolator 36 absorbs the reduction in clearance between housing 34 and race 30 when assembly 20 is press fit to housing 16. Isolator 36 accomplishes this while maintaining stiffness to keep bearings 32 centered within raceways 42, 44.

Washer 38 is provided to unitize assembly 20 and to control the amount of force required to press inner and outer races 28, 30 and bearings 32 out of housing 3 and bushing 40. Washer 38 may be made from conventional metals and metal alloys. Washer 38 is generally flat and annular in construction and is disposed about axis 26. The inner diameter of washer 38 is about equal to the inner diameter of wall 46 of housing 34.

Bushing 40 enables assembly 20 to be press-fit to shaft 14 without undue stress on race 28 and without affecting the internal clearance of bearings 32. Bushing 40 is adapted to be press fit onto steering shaft 14 and provides sufficient stiffness and friction to maintain the position of assembly 20. Bushing 40 may be made from conventional metals and metal alloys such as steel. Bushing 40 is annular in construction and disposed about axis 26. Referring to FIG. 3, bushing 40 defines radially outwardly extending flanges 70, 72 at either axial end configured to receive inner race 28 therebetween. In particular, flanges 70, 72 define beveled edges 74, 76 configured to engage edges 44, 46 of race 28. Busing 40 may be deformed to adapt assembly 20 to large tolerance shafts 14.

Figure 5:
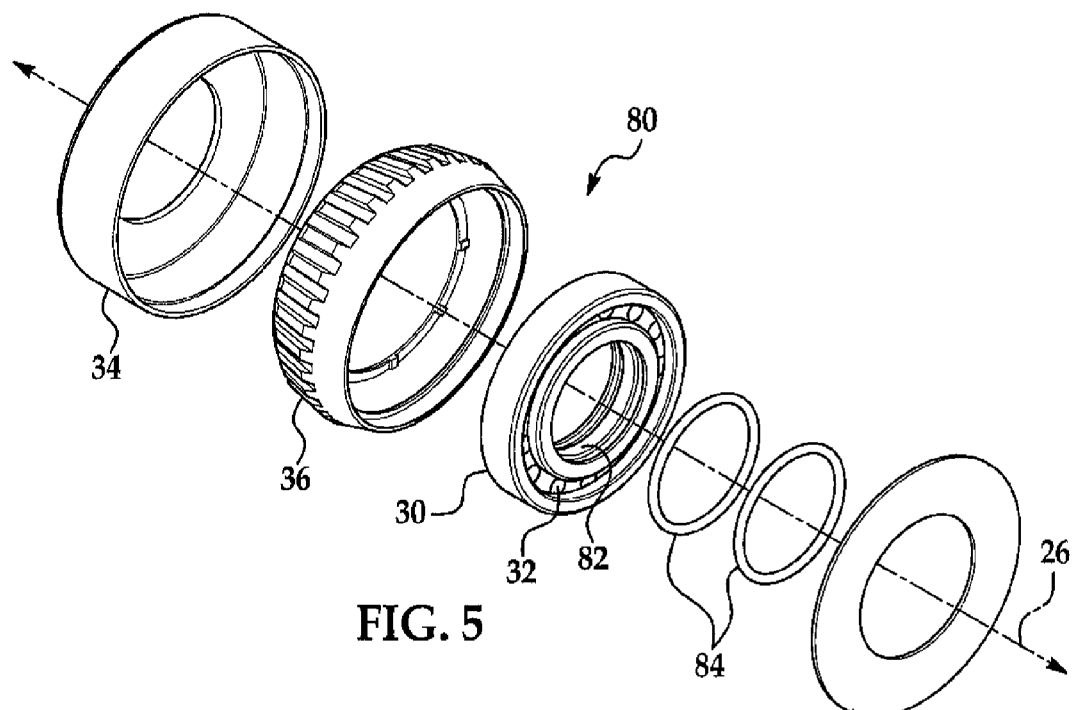
FIG. 5 is an exploded perspective view of a bearing assembly in accordance with another embodiment of the present invention.
Figure 6:
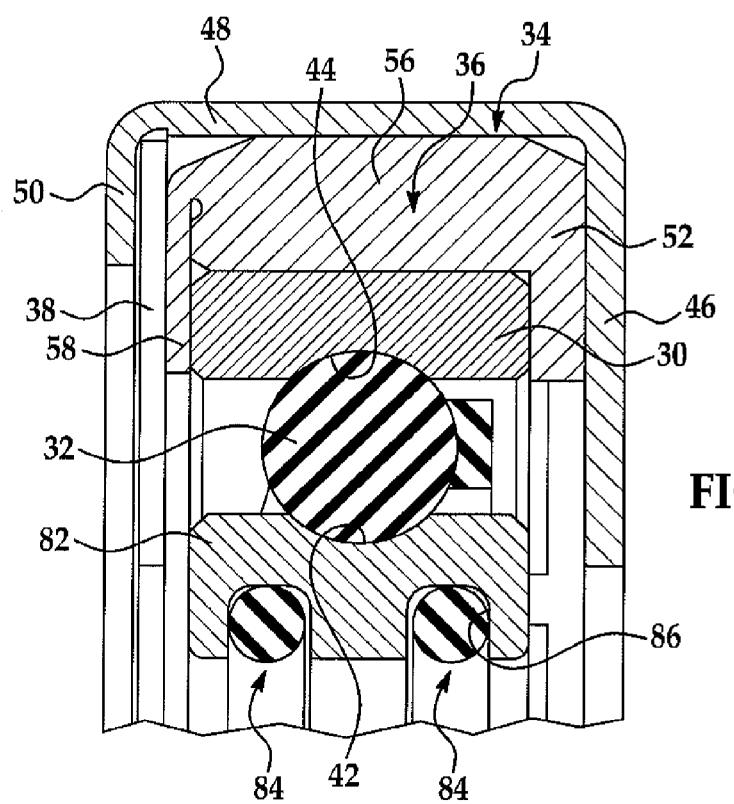
FIG. 6 is a partial cross-sectional view of the bearing assembly of FIG. 5.

Referring now to FIGS. 5-6, a bearing assembly 80 in accordance with another embodiment of the present invention is illustrated. Assembly 80 is substantially similar to assembly 20 and like parts are referred to using like reference numbers. Assembly 80 differs from assembly 20 in that the structure of inner race 82 differs from race 28 of assembly 20 and in the use of elastomeric rings 84 rather than bushing 40.

Inner race 82 provides an inner raceway 42 for engagement with bearings 32. Raceway 42 is preferably a ground raceway formed using a conventional grinder. Inner race 82 is disposed about shaft 14 and axis 26. Race 82 may be made from conventional metals or metal alloys. The radially inner surface of race 82 defines one or more circumferential grooves 86 configured to receive rings 84.

Rings 84 are provided to allow a slip fit for race 82 with shaft 14. Rings 84 are conventional in the art any may comprise conventional O-rings. Rings 84 absorb clearance between the shaft 14 and inner race 82 providing stiffness, but allowing shaft 14 to move axially under relatively low axial loads.

A bearing assembly 20 or 80 in accordance with the present invention represents a significant improvement over conventional bearing assemblies used in steering assemblies. The bearing assembly 20 or 80 can be press fit to the steering shaft 14 or housing 16 without undue stress on the inner and outer races 28, 30 or 82, 30 and without affecting the internal clearance for bearings 32 and torque requirements for the steering assembly 10. Further, the bearing assembly 20 or 80 maintains sufficient bearing stiffness and better tolerates angular misalignment with shaft 14 or housing 16. The improved structure further facilitates the use of precision ball bearings 32 and ground raceways 42, 44 thereby promoting smooth operating of the steering assembly 10 and eliminating the need for external preloading and related components.

While the invention has been shown and described with reference to one or more particular embodiments thereof, it will be understood by those of skill in the art that various changes and modifications can be made without departing from the spirit and scope of the invention.

I claim:

1. A bearing assembly, comprising:
   an unbroken, annular inner race disposed about a first axis;
   an unbroken, annular outer race disposed about said inner race
   a plurality of ball bearings disposed between said inner and outer races;
   a housing having a first radially extending wall disposed on one axial side of outer race and a deformable axially extending wall extending from said first radially extending wall along a second axis extending parallel to said first axis;
   an elastomeric isolator disposed between said housing and said outer race, said isolator having a first radially extending wall disposed between said one axial side of said outer race and said first radially extending wall of said housing and a deformable axially extending wall extending from said first radially extending wall of said isolator along a third axis extending parallel to said first axis, said axially extending wall of said isolator disposed between a radially outer surface of said outer race and said axially extending wall of said housing; and,
   a washer disposed on a second axial side of said outer race, said washer disposed between a second radially extending wall of said housing and a second radially extending wall of said isolator formed by deformation of said axially extending walls of said housing and said isolator, said second radially extending wall of said isolator disposed between said washer and said second axial side of said outer race.

2. The bearing assembly of claim 1, further comprising a bushing disposed radially inwardly of said inner race.

3. The bearing assembly of claim 2 wherein said inner race is disposed between first and second flanges disposed at either axial end of said bushing.

4. The bearing assembly of claim 1, further comprising an elastomeric ring disposed radially inwardly of said inner race.

5. The bearing assembly of claim 4 wherein said ring is disposed within a groove formed in a radially inner surface of said inner race.

6. The bearing assembly of claim 1 wherein said inner and outer races include ground raceways configured to received said ball bearings.

7. The bearing assembly of claim 1 wherein said first radially extending wall of said isolator defines a plurality of axially projecting pads configured to engage said first axial side of said outer race.

8. The bearing assembly of claim 1 wherein a radially outer surface of said axially extending wall of said isolator defines a plurality of ribs.

9. A steering assembly, comprising:
a steering shaft extending along a first axis and configured to transfer motion from a steering input device to a wheel;
a housing disposed about said shaft
a bearing assembly disposed between said steering shaft and said housing, said bearing assembly including:
an unbroken, annular inner race disposed about said first axis;
an unbroken, annular outer race disposed about said inner race
a plurality of ball bearings disposed between said inner and outer races;
a housing having a first radially extending wall disposed on one axial side of outer race and a deformable axially extending wall extending from said first radially extending wall along a second axis extending parallel to said first axis;
an elastomeric isolator disposed between said housing of said bearing assembly and said outer race, said isolator having a first radially extending wall disposed between said one axial side of said outer race and said first radially extending wall of said housing of said bearing assembly and a deformable axially extending wall extending from said first radially extending wall of said isolator along a third axis extending parallel to said first axis, said axially extending wall of said isolator disposed between a radially outer surface of said outer race and said axially extending wall of said housing of said bearing assembly; and,
a washer disposed on a second axial side of said outer race, said washer disposed between a second radially extending wall of said housing of said bearing assembly and a second radially extending wall of said isolator formed by deformation of said axially extending walls of said housing of said bearing assembly and said isolator, said second radially extending wall of said isolator disposed between said washer and said second axial side of said outer race.

10. The steering assembly of claim 9 wherein said bearing assembly further comprises a bushing disposed radially inwardly of said inner race.

11. The steering assembly of claim 10 wherein said inner race is disposed between first and second flanges disposed at either axial end of said bushing.

12. The steering assembly of claim 9, wherein said bearing assembly further comprises an elastomeric ring disposed radially inwardly of said inner race.

13. The steering assembly of claim 12 wherein said ring is disposed within a groove formed in a radially inner surface of said inner race.

14. The steering assembly of claim 9 wherein said inner and outer races include ground raceways configured to received said ball bearings.

15. The steering assembly of claim 9 wherein said first radially extending wall of said isolator defines a plurality of axially projecting pads configured to engage said first axial side of said outer race.

16. The steering assembly of claim 9 wherein a radially outer surface of said axially extending wall of said isolator defines a plurality of ribs.

\* \* \* \* \*